United States Patent Office 3,322,189
Patented May 30, 1967

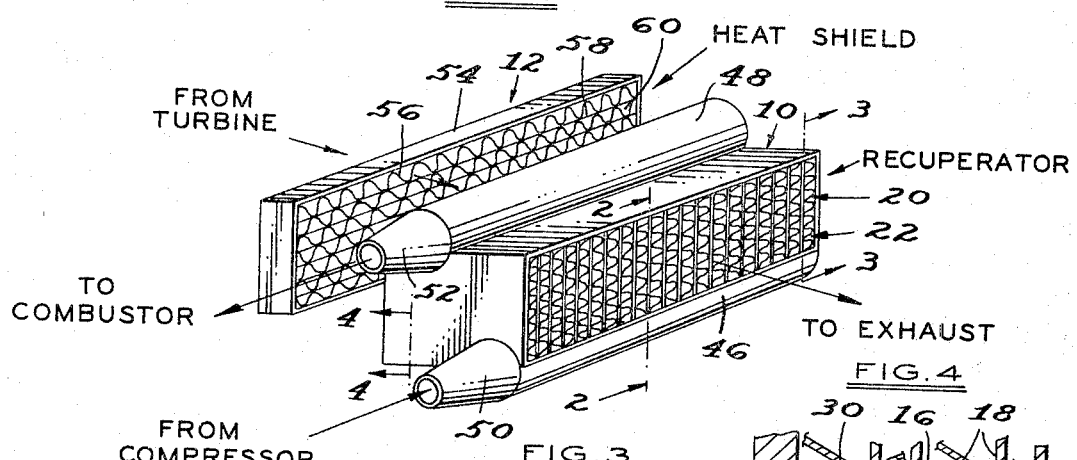
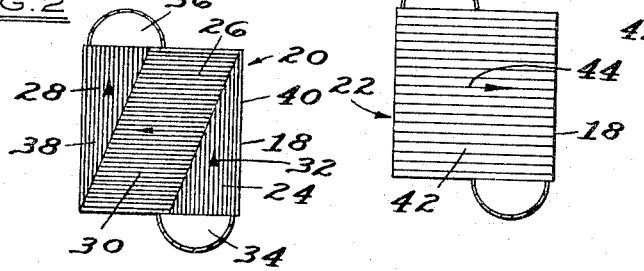
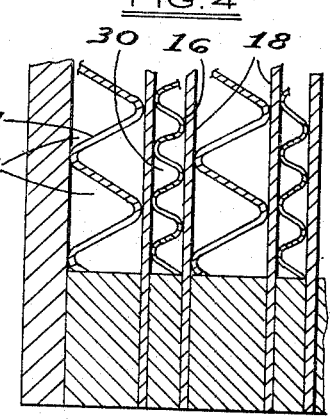
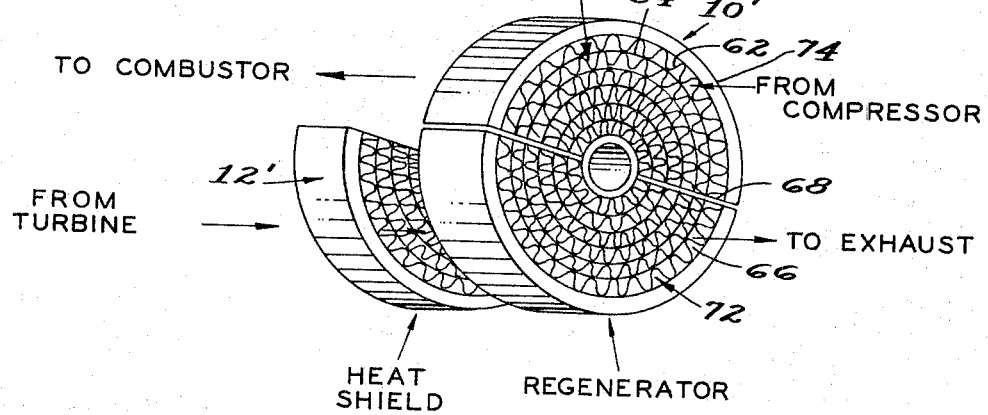

3,322,189
HEAT EXCHANGE ASSEMBLY
Armenag Topouzian, Detroit, Mich., assignor to Ford Motor Company, Dearborn, Mich., a corporation of Delaware
Filed Dec. 21, 1965, Ser. No. 515,357
9 Claims. (Cl. 165—8)

This invention relates in general to a heat exchanger assembly. More particularly, it relates to a gas turbine engine heat exchanger.

Gas turbine engines that are installed in motor vehicles generally use rotary regenerators or stationary recuperators to recover some of the heat of the turbine exhaust gases for transfer to the compressor discharge air before it enters the combustion section to thereby provide greater fuel economy. These heat exchangers generally are of a substantial width so that the fluid passages will be long enough to permit good heat transfer characteristics between the hot gases and relatively cool compressor air. One of the disadvantages of such construction, however, occurs during engine start-up and accelerating conditions of operation.

During start-up condition, for example, the turbine exhaust gases may reach a temperature of say 2,000° F., while during steady state operation, the temperature may be around 1,400° F. Before start-up, the metal portions of the heat exchanger are at ambient temperatures, which are, say, below 100° F. Therefore, upon start-up the flow of 2,000° temperature turbine gases into the heat exchanger will immediately cause a severe temperature gradient between the metal inlet and outlet sides of the regenerator. This produces excessive thermal stresses in the metal to a point where it may crack and cause failure of the heat exchanger. During steady state operation, the temperature drop across the heat exchanger is considerably less, say, 500° for example, which can be withstood by the metals. The invention provides means for preventing severe temperature gradients across the heat exchanger by limiting the gradients to values that are similar to those that exist during steady state operating conditions.

It is one of the objects of the invention, therefore, to provide a heat sink ahead of the heat exchanger in the path of flow of the turbine exhaust gases to temporarily reduce the gas temperature and thereby prevent severe temperature gradients across the heat exchanger during engine start-up and accelerating conditions of operation.

The invention accomplishes the above objective by providing a heat absorbing assembly ahead of the heat exchanger, the assembly consisting of a housing having a honeycomb structure consisting of a plurality of short fluid passages all extending in the general direction of flow of the turbine exhaust gases. The passages are short enough so that relatively little temperature difference exists between the inlet and outlet sides of the heat sink. Also, the metal forming the heat sink passages is chosen such as to quickly absorb the heat of the fluid passing through it.

It will be clear, therefore, that during accelerations or initial start-up of the gas turbine engine, the heat sink will act to place the heat exchanger inlet metal surface temperature out of phase with the turbine exhaust gas, and will, therefore, temporarily reduce the initial change in heat exchanger inlet temperature. Subsequent continued flow of the turbine exhaust gases will, of course, pass through the heat sink with a minimum drop in temperature due to the rapid absorption of heat by the heat sink.

Other objects, features and advantages of the invention will become apparent upon reference to the succeeding, detailed description thereof, and to the drawings illustrating the preferred embodiment thereof; wherein, FIGURE 1 is an isometric view of a heat exchanger assembly embodying the invention;

FIGURES 2 and 3 are enlarged cross-sectional views of portions of the heat exchanger assembly of FIGURE 1 taken on planes indicated by and viewed in the direction of the arrows 2—2 and 3—3 of FIGURE 1;

FIGURE 4 is an enlarged view of a detail of FIGURE 1; and,

FIGURE 5 is an isometric view of a rotary regenerator type heat exchanger embodying the invention.

FIGURE 1 shows a heat exchanger assembly including a heat transfer unit 10 of the stationary recuperator type combined with a heat sink or absorption means 12. The heat transfer unit 10 is of the sandwich type having corrugated members 14 and 16 (FIGURE 4) separated and sealed from each other by thin flat plates 18. More specifically, the unit comprises alternating parallel sections 20 and 22.

As seen in FIGURES 2 and 4, section 20 consists of two flat plates 18 between which are secured three corrugated members 24, 26 and 28 that together provide individual contiguous labyrinthian passages 30 for the flow of compressor discharge air therethrough in the direction of the arrows 32. Air inlet and outlet openings 34 and 36 are provided at diametrically-opposite points. Flow in a direction other than through passages 30 is prevented by end seal portions 38 and 40 consisting of, for example, rectangular bar stock of a thickness equal to the depth of passages 30 and the distance between separating plates 18.

The alternate sections 22, as best seen in FIGURE 3, consist of two flat separator sheets 18 between which is secured the single corrugated member 14 forming parallel continuous passages 42 through which the turbine exhaust gases can enter and pass through as indicated by the arrows 44.

As stated previously, sections 20 and 22 are stacked together in an alternating manner as shown in FIGURE 1. The compressor air inlet and exit portions 34 and 36 of each section 20 are interconnected by longitudinally extending manifolds 46 and 48 to suitable ducts 50 and 52 leading, respectively, from the gas turbine engine compressor section (not shown) and to the engine combustion section (also not shown).

Heat transfer unit 10 is of the counterflow type; that is, the turbine exhaust gases pass from left to right through the heat transfer unit, while the compressor discharge air passes in a counterdirection from right to left to provide for the greatest absorption of heat by the compressor air through the walls and sheets separating the two passages 30 and 42. It will be seen from FIGURE 4 that the turbine exhaust gas passages 42 are considerably larger in cross-sectional area than the compressor discharge air passage 30 to permit as great a heat transfer action as possible.

Heat sink unit 12 is bolted or otherwise suitably attached to the turbine exhaust gas inlet side of heat transfer unit 10 so that the turbine exhaust gases will pass through the heat sink before entering the heat exchanger. Unit 12 has an essentially rectangular housing 54 having a plurality of corrugated members 56 secured between thin sheet stock 58 to form contiguous fluid passages 60 through which the turbine exhaust gases flow. The metal used for the passages and separators would have high thermal absorption characteristics so as to readily absorb the heat of the turbine exhaust gases as they pass through the passages. The heat sink is of an over-all honeycomb-like construction, which permits substantially uninterrupted flow while subjecting both sides of the metal to the heat of the exhaust gases.

From the above description, it will be clear that when the gas turbine engine in which the heat exchanger is installed is inoperative, the temperature of the metal of unit 10, as well as that of the heat sink unit 12, will be whatever ambient temperature conditions are in the area surrounding these units, which generally would be below 100° F. for a motor vehicle. As soon as the gas turbine engine is started, the engine produces compressor discharge air in manifold 46 at a temperature of around 200° F., while, however, turbine exhaust gases at around 2,000° F., for example, begin flowing through heat sink 12 to the heat transfer unit 10. Heat sink 12 immediately absorbs a large portion of the heat of the exhaust gases so that when the exhaust gases reach the inlet side of heat transfer unit 10, the temperature will have been reduced to the neighborhood of around 700 to 500° F.

Thus, flow of the turbine exhaust gases through heat transfer unit 10 produces a temperature gradient across unit 10 that is only slightly greater than the gradient that exists when the assembly is at steady state operating temperatures. The thermal stresses on the gas inlet side of heat transfer unit 10, therefore, are minimized to a point that is easily withstood by the metal used.

It will also be clear that due to the high thermal absorption characteristics of heat sink 12, the metal in the sink will be brought up quickly to the turbine exhaust gas temperature. However, since the initial high start-up or accelerating temperature of the turbine exhaust gases remains at that level only temporarily, the time it takes for the heat sink to reach the turbine exhaust temperature is only slightly less than the time in which the turbine exhaust temperatures drop from, say, 2,000° F. to the approximately 1,400° steady state operating condition. By this time, the passage metal in heat transfer unit 10 will have had sufficient time to warm so that the temperature gradient across it will remain substantially constant.

FIGURE 5 shows a modification of the invention. In FIGURE 1, the heat transfer unit 10 is of the stationary recuperator type. FIGURE 5 shows the construction when the heat transfer unit is of the rotary regenerator type. More specifically, the heat transfer unit 10' in this case consists of a rotary housing containing a matrix of spirally wound corrugated material 62 on a sheet of flat, thin stock 64 providing contiguous longitudinally-extending fluid passages 66. The unit has a stationary crossarm member indicated schematically at 68 that divides the transfer unit into two sections 70 and 72. High pressure, low temperature compressor discharge air passes through the section 70 from right to left, as indicated, while the high temperature, low pressure turbine exhaust gases pass through section 72 from left to right, as also indicated. In this case, the narrow width heat sink or heat shield unit 12' is substantially semi-cylindrical in shape, and is attached to the stationary crossarm of heat transfer unit 10' ahead of the inlet for the turbine exhaust gases so as to operate in a manner substantially the same as described in connection with the FIGURE 1 construction. Heat sink 12' is of a construction similar to heat sink 12 in FIGURE 1, and operates in the same manner.

From the foregoing, it will be seen that the invention provides a simple and economical apparatus for reducing the thermal stresses on a heat exchanger unit during extreme temperature changes, and that, during normal steady state operating conditions, permits the heat transfer unit to operate in a conventional manner.

While the heat exchanger assembly of the invention has been described preferably for use in gas turbine engine, it will be clear that it would have use in installations other than that shown wherever severe temperature gradients across the heat exchanger would prevail, and that many changes and modifications thereto can be made without departing from the scope of the invention.

I claim:

1. A heat exchange assembly comprising, in combination, a heat transfer member consisting of a housing having contiguous independent fluid passages for a flow of different temperature fluids under pressure therethrough between an inlet and an outlet for the transfer of heat between said fluids through the walls of said passages, said heat transfer providing a temperature varient between the entrance and exit passage portions of said housing, and heat absorbing means formed from a material of essentially high thermal absorption characteristics in the path of flow of the higher temperature fluid and upstream of the inlet to its housing passage for minimizing the initial temperature gradient across said heat exchanger unit passages in response to initial flow of a high temperature fluid through said unit at a time when said unit is at ambient temperature conditions, continued flow of said high temperature fluid rendering said heat absorption means inoperative.

2. A heat exchange assembly as in claim 1, wherein said heat absorption means comprises a housing having a plurality of fluid passages with thermal absorbing walls extending in the direction of flow of said high temperature fluid and of an axial extent short in comparison to the length of said heat transfer housing passages.

3. A heat exchange assembly as in claim 1, wherein said heat transfer unit comprises a stationary counterflow type recuperator.

4. A heat exchange assembly as in claim 1, wherein said heat transfer unit comprises a rotary regenerator having portions alternately communicating with the fluid, said heat absorbing means comprising a heat sink located ahead of one portion of said regenerator.

5. A heat exchange assembly as in claim 1, wherein said heat absorbing means has a honeycomb-like construction providing short length contiguous fluid passages all extending essentially in the direction of flow of the high temperature fluid.

6. A heat exchange assembly as in claim 1, wherein said contiguous passages extend substantially at right angles to each other for essentially a crossflow of said fluids with respect to each other.

7. A heat exchange assembly for use in a gas turbine engine having a source of low temperature compressor discharge air, and a source of high temperature turbine exhaust gases, comprising, a heat transfer member consisting of a housing having a plurality of contiguous independent passages respectively flowing compressor discharge air and turbine exhaust gases therethrough for the transfer of heat through the housing passage walls between said gases and air, said passages having an inlet and an outlet longitudinally spaced providing a temperature gradient between the inlet and outlet sides of said housing, and a heat sink means formed from a material of essentially high thermal absorption characteristics positioned ahead of the inlet to the turbine exhaust gas passages to minimize the initial temperature gradient across said heat exchanger upon start-up condition of operation of said gas turbine engine providing a high initial temperature to said exhaust gases at a time when ambient temperature conditions prevail at the inlet and outlet sides of said heat exchanger housing passages, continued operation of said engine rendering said heat sink means inoperative.

8. A heat exchange assembly as in claim 7, said heat sink means comprising a narrow width housing having a honeycomb-like construction providing longitudinally extending essentially short fluid passages all extending in the direction of flow of the turbine exhaust gases.

9. A heat exchange assembly as in claim 8, wherein the walls of said heat sink means passages are thermally conductive to initially absorb heat from said gases until they attain essentially the temperature of said gases.

References Cited

UNITED STATES PATENTS

| 1,699,987 | 1/1929 | Parsons | 165—134 |
| 1,853,684 | 4/1932 | Jacobus | 165—134 X |
| 2,650,073 | 8/1953 | Holm | 60—39.51 X |
| 2,952,445 | 9/1960 | Ladd | 165—166 |

FOREIGN PATENTS

| 719,775 | 12/1954 | Great Britain. |
| 724,176 | 2/1955 | Great Britain. |

ROBERT A. O'LEARY, *Primary Examiner.*

A. W. DAVIS, *Assistant Examiner.*